Sept 10, 1957  J. S. VOIGT  2,805,726
POWER STEERING LINKAGE
Filed Aug. 6, 1954  2 Sheets-Sheet 1
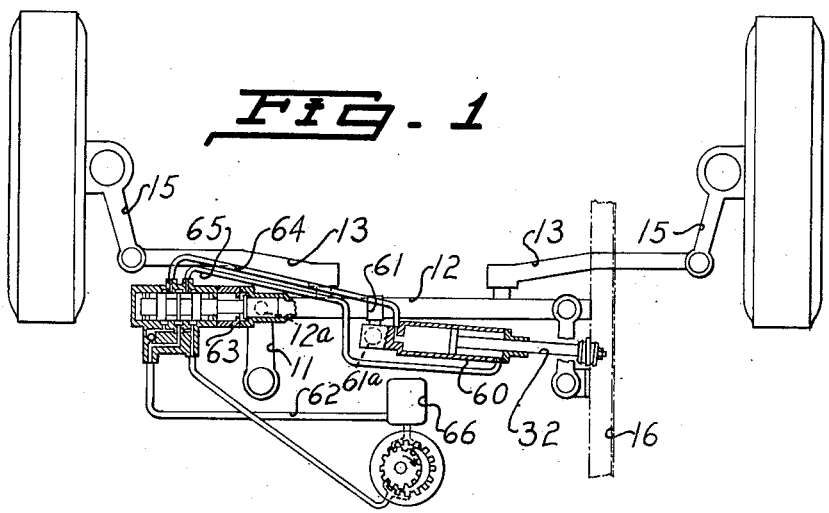
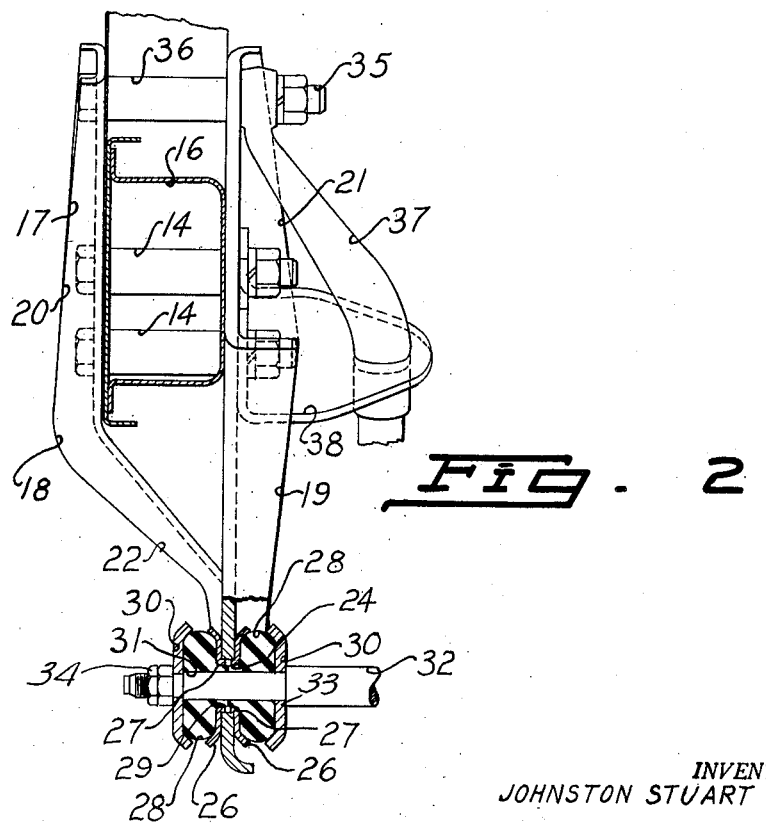
INVENTOR.
JOHNSTON STUART VOIGT
BY Carl J. Barbee

United States Patent Office 2,805,726
Patented Sept. 10, 1957

2,805,726

POWER STEERING LINKAGE

Johnston Stuart Voigt, Kenosha, Wis., assignor to American Motors Corporation, a corporation of Maryland Application August 6, 1954, Serial No. 448,297

4 Claims. (Cl. 180—79.2)

This invention relates to power steering mechanism of the hydraulic type for use in an automotive vehicle.

The handling of a steering wheel in present day automobiles imposes undue fatigue on the driver through reason of weight and speed of modern vehicles. Overcoming this fatigue is the reason for power steering. Power steering comprises mechanism that takes over the work of turning the wheels of an automobile immediately after such turning has been initiated by the driver.

It is an object of this invention to provide a power steering apparatus comprising a hydraulic cylinder and piston and piston rod, said rod having its free end fixed in a bracket secured indirectly to the sill of an automobile. An intermediate member carries the cylinder and when hydraulic pressure is introduced at either side of the piston, movement of the cylinder and intermediate member is effected for actuating appropriate linkage to effect turning of the wheels.

A specific object of the invention is to provide an "anti-roll" mechanism for use in a power steering arrangement.

Another object is to provide a novel mounting at the idler end of the linkage actuating member of power steering apparatus.

I am aware of the various constructions heretofore used with respect to power steering of an automobile. Under the circumstances it will be manifest that it is my chief aim to generally improve upon prior structures of the general type by providing an arrangement characterized by appreciable refinements and structural improvements. My arrangement provides power steering mechanism that is compact and efficient in operation, is economical to manufacture and particularly adaptable for the purposes intended.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures and in which:

Figure 1 is a schematic view of parts making up the power steering system to which my invention is a necessary part.

Figure 2 is an end view of a bracket assembly for supporting the piston rod and the idler arm as viewed from the front of the vehicle.

Figure 3:
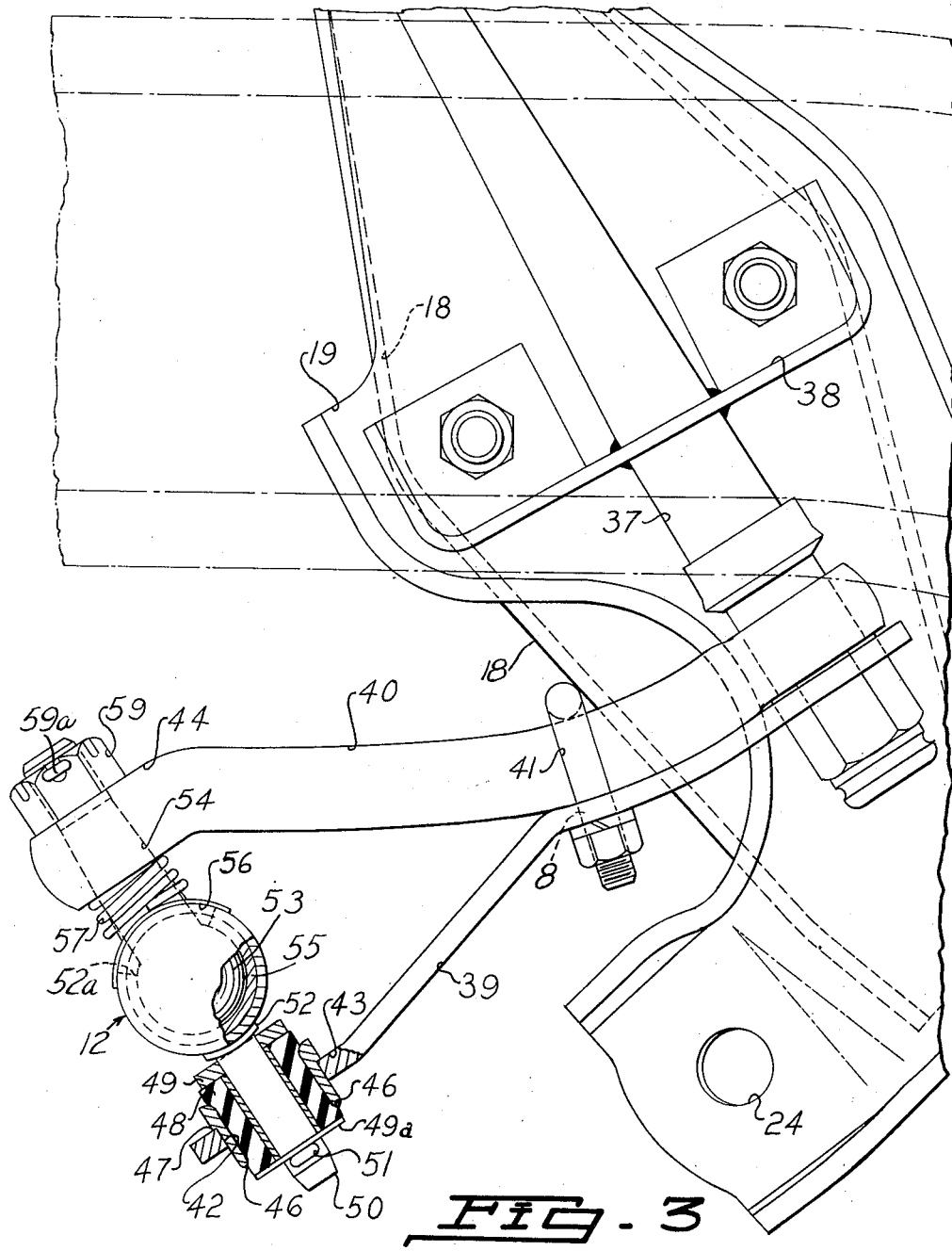
Figure 3 is an enlarged side view of the assembly of Figure 2 showing the arrangement of the anti-roll bracket with the various connected parts.

The mechanism comprises the usual steering wheel column (not shown) carrying gearing (not shown) mounted at the base of the steering post. Referring to the drawings, a pitman arm 11 is connected to the gearing in a usual manner and at its other end is linked to an intermediate member 12 as at 12a. The intermediate member 12 extends cross-wise with respect to the vhicle and has the usual tie rods 13, one each of which is connected adjacent each end of said intermediate member. Each free end of said tie rods is pivotally connected to a steering arm 15. The connection between each tie rod and intermediate member in the present instance is in the form of a ball joint (not shown).

To the sill 16 of an automobile is attached a bracket 17. This bracket is made up initially of two distinct parts 18 and 19 welded together. The free end 20 of part 18 and the free end 21 of part 19 extend outwardly away from each other adjacent the welded connection and then are parallel to each other on each side of said sill. Each free end 20 and 21 is provided with similarly opposed apertures and are positioned on said sill providing space for receiving suitable fastening elements 14 to secure bracket 17 to the sill. Each part 18 and 19 is provided with suitable channel portions to insure greater rigidity to each part and strengthen each part when in operative position.

The part 19 extends downwardly and beyond said welded connection with part 18 and has an enlarged aperture 24.

The plates of a pair of cup-shaped retainer plates 26 are disposed one on each side of said aperture 24 and each having a collar 27 disposed within each side of said aperture. Nested within each plate 26 is a rubber bushing 28 each in turn having a collar 29 within each respective collar 27. The opposite side of each bushing is enclosed by a cup-shaped plate 30. Each plate and bushing is provided with a centrally disposed aperture and when said bushing and plates are assembled all of the apertures are in line and adapted to receive the reduced free end 31 of a piston rod 32. This reduced end together with the adjacent end of the piston rod 32 includes a shoulder 33 which butts against one of the plates 30. The reduced end is threaded so that said end may be locked in said bracket through the medium of suitable fastening elements 34.

The free ends of said bracket extend beyond the sill with aligned apertures arranged in each part 18 and 19 to receive a bolt 35 passing through a bushing 36 spaced between said parts with said bolts extending a substantial distance beyond said part and having an idler arm 37 mounted on said bolt and held thereon by a lock washer and a nut. A bracket 38 is secured to part 19 and is provided with an enlarged aperture through which said arm 37 projects. Rotatably mounted on the free end of said arm is an anti-roll bracket 39 and an idler arm link 40. Said bracket 39 and link 40 are tied together adjacent said pivoted connection by a U-bolt 41 enclosing said link 40 and passing through spaced apertures 8 arranged in said bracket 39. The bracket and link project outwardly and away from each other with the ends 43 and 44 arranged parallel with one another. The end 43 of bracket 39 is provided with an enlarged aperture 42 having a bushing 46 forced therein with said bushing provided with a shoulder 47 upon which one edge of said aperture butts. A tubular grommet 48 fabricated of resilient material is forced into said bushing with the ends of said grommet overlapping each end of said bushing 46. The overlapping is carried out by placing washers 49 and 49a on each end of said grommet and inserting a headed pin 50 through said grommet and securing said pin 50 in place by inserting a cotter pin 51 through a slot provided in the free end of said pin. In operation, the head 52 of the pin is welded to one end of the intermediate member 12. The intermediate member is provided with an enlarged opening 52a of sufficient size to receive the balled end 53 of a stud 54. The combination of said opening and said ball comprises a ball and socket connection with said balled end free to move within said intermediate member within a bearing 55 disposed in said opening, and spaced between the inside wall of said intermediate member 12 and said balled end 53. A dust cap 56 fits over the opening and is held in place by a spring 57 butting against the link 40. The threaded end of stud 54 which is partly tapered extends through an enlarged tapered opening in the end of link 40 and the link is capable of rotative movement relative to the stud. A suitable fastening element 59 is threaded onto the end of the stud and held against rotation relative to the stud by a cotter pin 59a. The piston attached to said piston rod 32 is enclosed in a hydraulic cylinder 60. This cylinder has a link or extension 61 which is mounted to said intermediate member by a ball and socket joint 61a. A valve 63 is connected to the opposite end of said tie rod and arranged to uncover a predetermined port in said valve immediately upon the manual effort expended in the turning operation. Fluid is received through a conduit 62 which is in direct communication with a reservoir 66 in the engine compartment. This fluid is directed through either conduit 64 or 65 one each of which communicates with the opposite ends of said cylinder, and, depending on the direction in which the wheels of the vehicle are turned, have fluid directed thereto and by so doing force the cylinder over the piston rod. Movement of said cylinder swings said intermediate member in the direction of turning movement initially carried out by manual application.

The anti-roll bracket is of special note in that it insures a structure of unusual rigidity to support the intermediate member and thus prevent undue strain and wobbling of said intermediate member during actual steering operation. The weight of the hydraulic cylinder and piston rod together with associated structures imposes considerable strain upon the intermediate member. This is in addition to the road shock brought about by the twisting of the tie rods to roll the intermediate member. To insure a minimum amount of wear and tear on the ball and socket joint between stud 54 and the recess in the intermediate member, the anti-roll bracket maintains the intermediate member in a stable supported position to insure more rotative movement of the balled end 53 in the recess without wearing bearing pressure against the walls of the opening.

It is thought that the construction, manipulation, utility, and advantages of this invention will now be apparent to those skilled in this art without a more detailed description thereof.

The present embodiment of the invention has been described in detail merely for the purpose of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

1. Power steering apparatus for an automobile comprising: an intermediate member, a pair of tie rods mounted on said member, a steering arm connected to the free end of each tie rod, a hydraulic cylinder having one end connected to said intermediate member, a piston and piston rod within the cylinder and supporting same for reciprocating movement, a U-shaped bracket secured to the sill of said automobile, the free end of said piston rod being mounted in said bracket, an idler arm secured to said bracket, a steering link and a bracket mounted on the free end of said idler arm, the free ends of said last named link and bracket projecting outwardly and away from each other and having extensions at their free ends substantially parallel to each other, said bracket extension having a pin secured therein with one end of said pin mounted on said intermediate member, said link extension having a pin secured therein, the free end of said last named pin being sphere shaped and rotatably mounted in said intermediate member.

2. For use with an automobile having dirigible wheels, a power steering apparatus comprising: an intermediate member and linkage connecting said member to the wheels, a steering link provided at one end with an enlarged aperture, a pin having a sphere shaped portion at one end thereof, an enlarged opening in said intermediate member having a bearing portion to rotatably mount said sphere shaped portion, an anti-roll bracket provided with an enlarged aperture and having an apertured grommet secured therein, a pin mounted in said apertured grommet with one end of said pin secured to said intermediate member on the side thereof opposite from said link connection; an idler arm; the free ends of said anti-roll bracket and steering link being secured to said idler arm, said anti-roll bracket forming a support for said intermediate member to prevent rolling and wobbling of said intermediate member.

3. In an automobile having power steering, an intermediate member, a pair of tie rods mounted on said member, a steering arm connected to the free end of each tie rod, a hydraulic cylinder having one end connected to said intermediate member, a piston and piston rod reciprocably supporting said cylinder, a U-shaped bracket secured to the sill of said automobile, the free end of said piston rod mounted in said bracket, an idler arm secured to said bracket, a steering link and an anti-roll bracket mounted on the free end of said idler arm, the free ends of said last named link and anti-roll bracket projecting outwardly and away from each other and having extensions at their free ends substantially parallel to each other, said bracket extension having an enlarged aperture, a bushing and an apertured grommet mounted in said aperture, a headed pin inserted in said grommet and held securely in place by a locking element in said pin, the headed portion of said pin being welded to the surface of said intermediate member, said link extension being provided with an enlarged tapered aperture, a stud having a tapered portion received in the tapered aperture of the link, threads on the stud at one end thereof; a spherical portion at the other end of the stud; said intermediate member having an enlarged pocket within which the spherical portion of the stud is received for rotatable movement therein.

4. For use with an automobile having dirigible wheels, a frame and power steering apparatus for turning the wheels, said latter apparatus including an intermediate member extending crosswise of the automobile, steering linkage connected to and interposed between the wheels and the intermediate member, a steering link connected to the intermediate member for initiating movement of same, a valve on the intermediate member, a cylinder connected to the intermediate member, a piston and a piston rod within the cylinder, the end of said piston rod being connected to the frame, an anti-roll mechanism for the intermediate member comprising: a stationary arm secured to the frame; an idler arm having one end pivotally carried on the stationary arm; a stud having one end rotatably receiving the end of the idler arm remote from the end which is carried on the stationary arm; a spherical surface on the stud; said intermediate member having a pocket within which the spherical surface on the stud is received; an anti-roll bracket anchored to the idler arm and being resiliently connected to the intermediate member on the side thereof opposite from the side on which the idler arm is located.

References Cited in the file of this patent

UNITED STATES PATENTS

| | | |
|---|---|---|
| 1,150,125 | King | Aug. 17, 1915 |
| 1,378,783 | Griffeth | May 17, 1921 |
| 1,509,031 | Sandstrom | Sept. 16, 1924 |
| 2,588,544 | Langer | Mar. 11, 1952 |
| 2,676,663 | Smith | Apr. 27, 1954 |

OTHER REFERENCES

Automotive Industries—Aug. 1, 1953, pp. 69, 106.